(12) United States Patent
Pino, Jr. et al.

(10) Patent No.: US 10,851,517 B2
(45) Date of Patent: Dec. 1, 2020

(54) MULTIFUNCTIONAL REEL CARRIER-VAC-SPOIL MATERIAL HANDLING CONTAINER AND METHOD OF TRENCHING AND LAYING CABLE OR DUCT

(71) Applicant: CORBEL COMMUNICATIONS INDUSTRIES, LLC, Bronx, NY (US)

(72) Inventors: Angelo J. Pino, Jr., New York, NY (US); Daniel Urban, Austin, TX (US)

(73) Assignee: CCIIP LLC, New York, NY (US)

( * ) Notice: Subject to any disclaimer, the term of this patent is extended or adjusted under 35 U.S.C. 154(b) by 714 days.

(21) Appl. No.: 15/785,967

(22) Filed: Oct. 17, 2017

(65) Prior Publication Data
US 2018/0106015 A1    Apr. 19, 2018

Related U.S. Application Data

(60) Provisional application No. 62/409,486, filed on Oct. 18, 2016, provisional application No. 62/432,428, filed on Dec. 9, 2016, provisional application No. 62/458,370, filed on Feb. 13, 2017, provisional application No. 62/537,723, filed on Jul. 27, 2017,
(Continued)

(51) Int. Cl.
| | |
|---|---|
| *E02F 5/02* | (2006.01) |
| *E02F 5/10* | (2006.01) |
| *G02B 6/44* | (2006.01) |
| *B65H 49/38* | (2006.01) |
| *G02B 6/50* | (2006.01) |

(Continued)

(52) U.S. Cl.
CPC .............. *E02F 5/10* (2013.01); *B65H 49/327* (2013.01); *B65H 49/38* (2013.01); *E02F 5/101* (2013.01);
(Continued)

(58) Field of Classification Search
CPC .................................. H02G 9/00; G02B 6/504
See application file for complete search history.

(56) References Cited

U.S. PATENT DOCUMENTS

| | | | | |
|---|---|---|---|---|
| 5,913,638 A | * | 6/1999 | Lansdale | .................. E02F 5/12 37/367 |
| 9,485,468 B2 | | 11/2016 | Pino | |

(Continued)

FOREIGN PATENT DOCUMENTS

| | | | |
|---|---|---|---|
| CA | 2348062 | * | 11/2001 |

OTHER PUBLICATIONS

Camplex Fiber Optic Extender, http://www.camplex.com/product.aspx?item=CMX-TACNGO-SDI, pp. 1-2.
(Continued)

*Primary Examiner* — Sean D Andrish
(74) *Attorney, Agent, or Firm* — Jeffrey S. Melcher; Melcher Patent Law PLLC

(57) ABSTRACT

Provided is a multifunctional reel carrier, spoil material handling container device having a first trailer or first truck bed, a first container constructed to contain spoil on the first trailer or first truck bed, at least one spoil transporting device constructed to transfer spoil from a micro trencher and deposit the spoil in the first container and constructed to transfer spoil from the first container to a fill device, and at least one reel holder constructed to hold a reel of cable and/or innerduct/microduct present on the first truck or first trailer, or present on a second trailer or second truck. Also provided is a method of using the multifunctional reel carrier, spoil material handling container device to lay cable and/or innerduct/microduct underground.

26 Claims, 18 Drawing Sheets

Related U.S. Application Data provisional application No. 62/551,311, filed on Aug. 29, 2017, provisional application No. 62/554,562, filed on Sep. 5, 2017.

(51) Int. Cl.
    *E02F 5/12*     (2006.01)
    *B65H 49/32*     (2006.01)
    *E02F 7/02*     (2006.01)
    *E02F 7/06*     (2006.01)

(52) U.S. Cl.
    CPC ............... *E02F 5/12* (2013.01); *E02F 7/02* (2013.01); *E02F 7/06* (2013.01); *G02B 6/445* (2013.01); *G02B 6/4457* (2013.01); *G02B 6/504* (2013.01); *B65H 2701/32* (2013.01)

(56) References Cited

U.S. PATENT DOCUMENTS

| | | | | |
|---|---|---|---|---|
| 2005/0036749 A1* | 2/2005 | Vogel | .................... | G02B 6/504 385/100 |
| 2005/0191133 A1* | 9/2005 | Purcell | .................... | G02B 6/504 405/157 |
| 2013/0011198 A1* | 1/2013 | Pichler | .................... | E02F 5/08 405/157 |
| 2015/0125218 A1* | 5/2015 | Gustavsson | ............ | G02B 6/504 405/175 |
| 2016/0376767 A1* | 12/2016 | Miller | .................... | E02F 5/08 37/94 |

OTHER PUBLICATIONS

Corning Fiber Optic Extenders, https://www.corning.com/worldwide/en/products/communication-networks/products/fiber.html, pp. 1-7.
SC Polymer, https://www.surecretedesign.com/product/liquid-concrete-polymer/, p. 1.
SCAG Giant VAC, http://www.giant-vac.com/, pp. 1-2.
DR Power Vacuum, https://www.drpower.com/, pp. 1-2.
Billy Goat vaccum, www.billygoat.com, pp. 1-2.
Ditch Witch, www.ditchwitch.com, p. 1.
Trenchers, www.vermeer.com, pp. 1-15.
Trenchers, www.samarais.com, pp. 1-2.

* cited by examiner

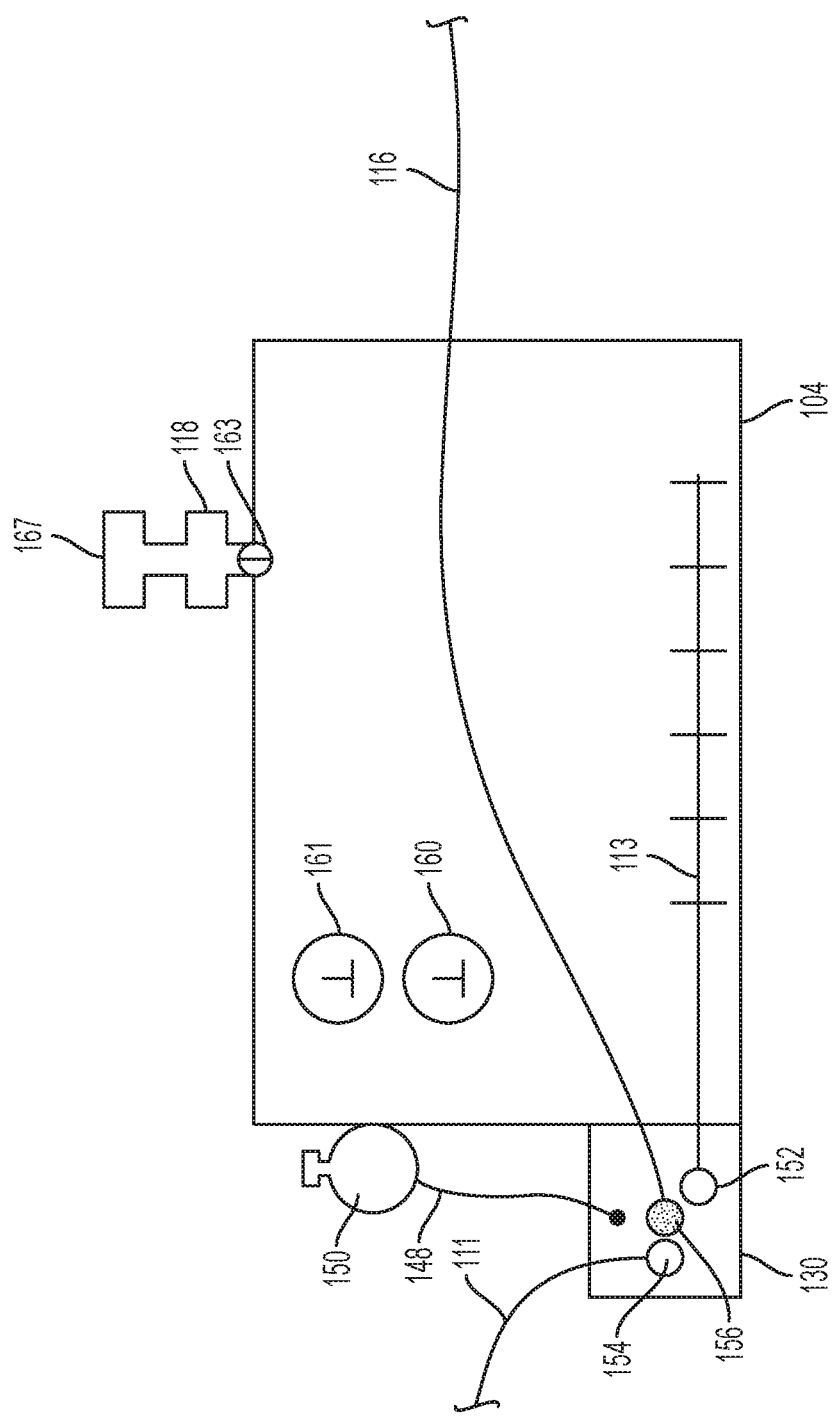

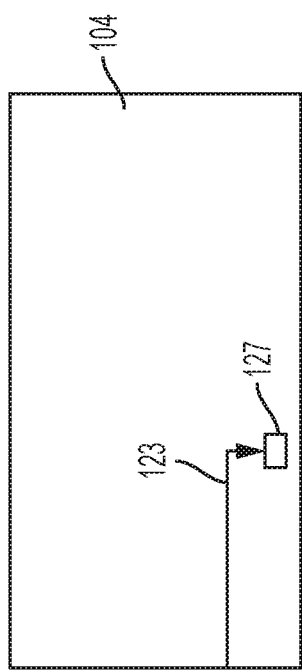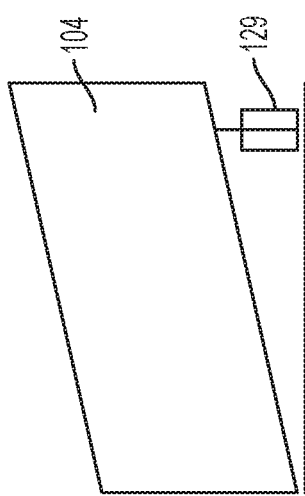

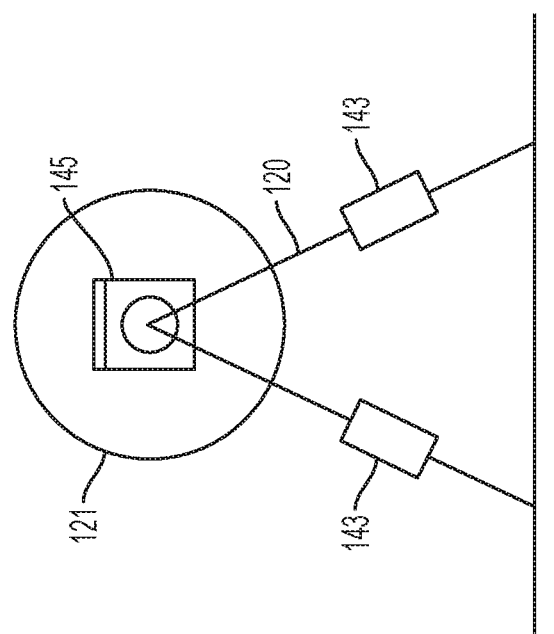

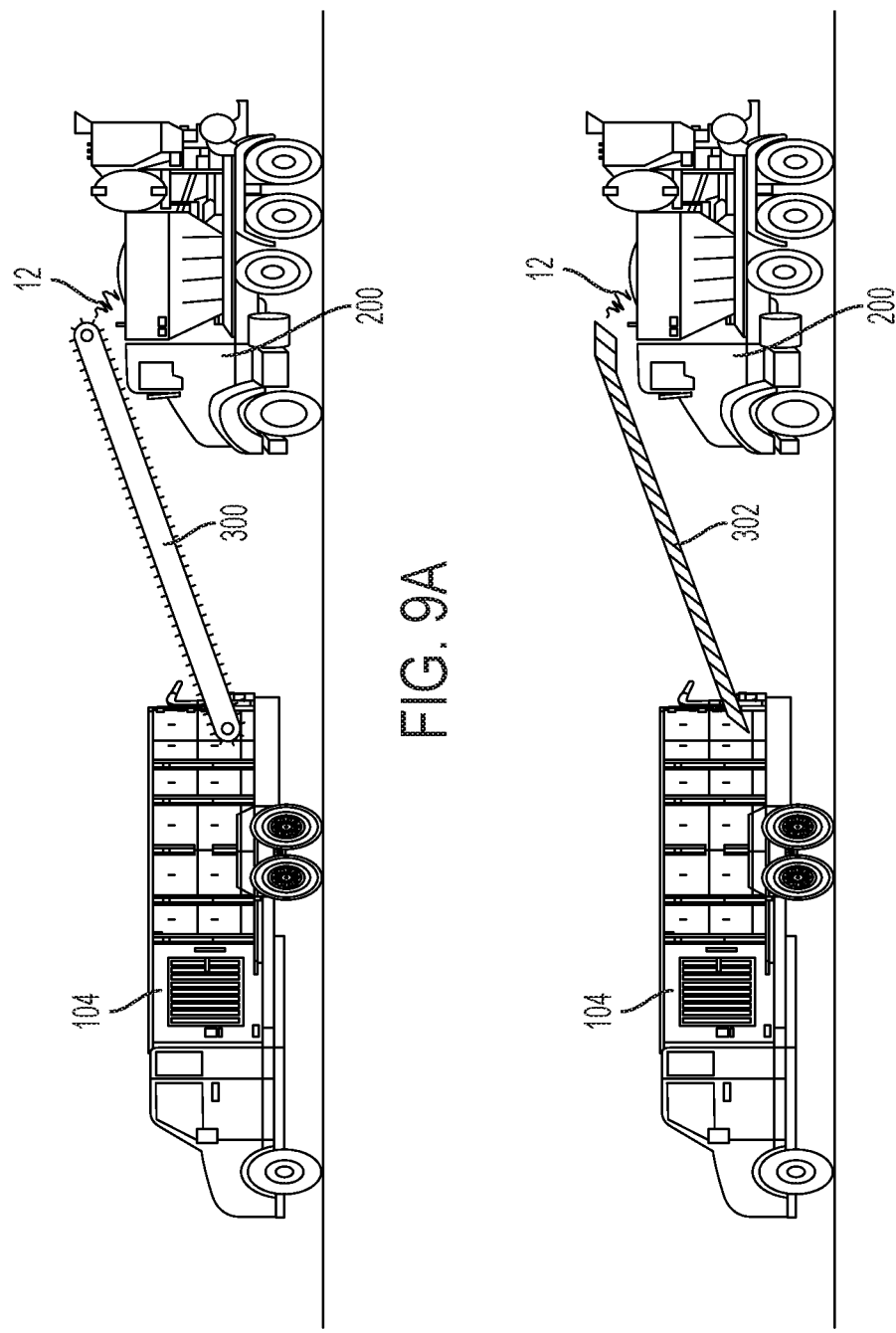

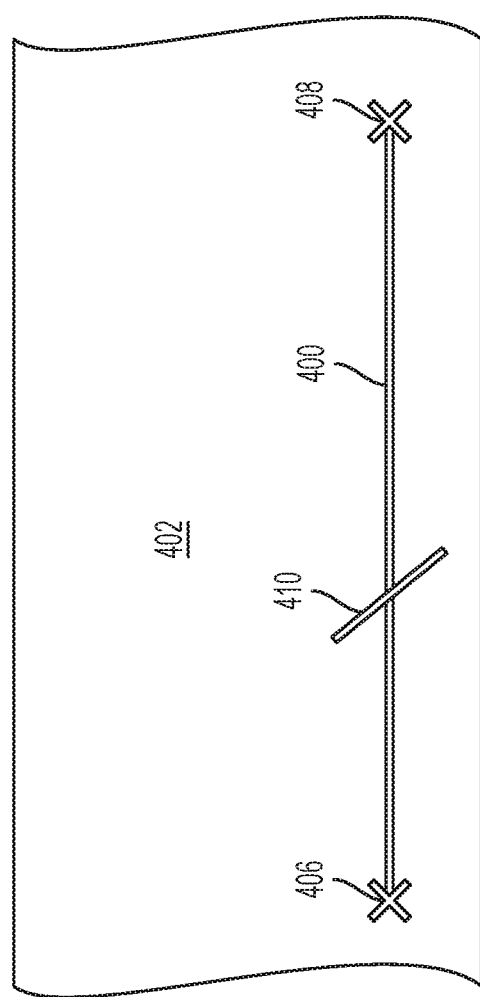

MULTIFUNCTIONAL REEL CARRIER-VAC-SPOIL MATERIAL HANDLING CONTAINER AND METHOD OF TRENCHING AND LAYING CABLE OR DUCT

FIELD OF THE INVENTION

The invention generally relates to a multifunctional reel carrier, spoil material handling container device for continuously trenching and laying cable and/or innerduct/microduct, and a method of using the device to continuously trench and lay cable and/or innerduct/microduct. The invention further generally provides a method and device for providing a temporary and permanent optical fiber network.

BACKGROUND OF THE INVENTION

Conventional devices for the trenching and laying cable or duct cannot be used continuously. The micro trencher saw usually creates a pile of spoil (dirt, asphalt, concrete, etc.) alongside the formed trench and the trench must be cleaned before laying the cable in the trench. The pile of spoil must then be removed. A fill, also referred to as cement or grout, is inserted into the trench on top of the cable or innerduct/microduct. Large industrial vacuum trailers have been used to remove the piled up spoil. However, many hours are wasted by having to dump the spoil from the trailers.

There is a great need for a device that can be used to continuously remove and in some instances recycle the spoil to in effort to increase the speed for placing the cable and/or innerduct/microduct and to reduce the down time of roadways, and also to reduce production costs.

While the vacuum truck concept is known in the industry, there is no current vacuum system that allows one to use a second vacuum or one vacuum to expel the cutting spoils into a cement/zim mixer or container allowing for the material to be recycled.

Installing new optical fiber networks to a location is expensive and time consuming. There is a great need for faster and less expensive installation of optical fiber networks.

SUMMARY OF THE INVENTION

An objective of the invention is to provide a device to continuously form a microtrench, remove and store/recycle the spoils and place cable and/or innderduct/microduct.

The objectives of the invention can be achieved by a multifunctional reel carrier, spoil material handling container device constructed for continuously trenching, laying a cable or innerduct/microduct, and filling the trench comprising:
 a first trailer or first truck;
 a first container constructed to contain spoil on the first trailer or first truck;
 at least one spoil transport device constructed to continuously transport at least a portion of the spoil from a micro trencher creating a trench and deposit the spoil in the first container and constructed to transfer at least a portion of the spoil from the first container to a fill device; and
 at least one reel holder constructed to hold a reel of the cable or innerduct/microduct on the first trailer or first truck, or on a second trailer or second truck and constructed to continuously lay the cable or innerduct/microduct in the trench.

The objectives can further be obtained a method of laying cable or innerduct/microduct comprising:
 using a micro-trencher to continuously cut a micro-trench in the ground and create spoil;
 continuously transferring the spoil from the micro-trencher using a multifunctional reel carrier, spoil material handling container device comprising:
  a first truck or first trailer;
  a first container constructed to contain spoil on the first truck or first trailer; and
  a first spoil transfer device constructed to transfer spoil from a micro trencher and deposit the spoil in the first container;
 continuously laying a cable and/or innerduct/microduct in the trench from a reel device located on the first truck or first trailer, or on a second truck or second trailer;
 continuously using a second spoil transfer device to transfer spoil from the at least one container to a fill device and
 continuously filling the trench with a fill from the fill device, wherein the fill comprises at least a portion of the spoil.

Objectives of the invention can be met by a method of continuously laying cable or innerduct/microduct comprising:
 continuously using a micro-trencher to cut a micro-trench in ground and create spoil;
 continuously transporting at least a portion of the spoil from the micro-trencher to a first container constructed to contain spoil using at least one spoil transporting device;
 continuously laying the cable and/or innerduct/microduct in the trench from a reel device; and
 continuously filling the trench with a fill from the fill device.

Objectives of the invention can be further met by a method of providing a temporary and permanent optical fiber network comprising:
 dispensing an optical fiber from a support, the optical fiber having a first end and a second end;
 laying the dispensed optical fiber on a surface;
 covering the dispensed optical fiber with a protection device that protects the optical fiber from footwear or vehicle traffic;
 connecting the first end to a feed;
 connecting the second end to a desired user; and
 using the method to bury the optical fiber to form a permanent optical fiber network comprising:
 continuously using a micro-trencher to cut a micro-trench in ground and create spoil;
 continuously transporting at least a portion of the spoil from the micro-trencher to a first container constructed to contain spoil using at least one spoil transporting device;
 continuously laying the cable and/or innerduct/microduct in the trench from a reel device; and
 continuously filling the trench with a fill from the fill device.

BRIEF DESCRIPTION OF THE DRAWINGS

FIG. 6A illustrates a container device having an intake system.

FIG. 6D illustrates a container device having a moving inlet device.

FIG. 6E illustrates a container device having a dump body.

FIG. 7 illustrates a reel.

FIG. 9A illustrates an embodiment of spoil transport device.

FIG. 9B illustrates an embodiment of spoil transport device.

FIG. 10 illustrates a marker line.

DETAILED DESCRIPTION OF THE INVENTION

Figure 1:
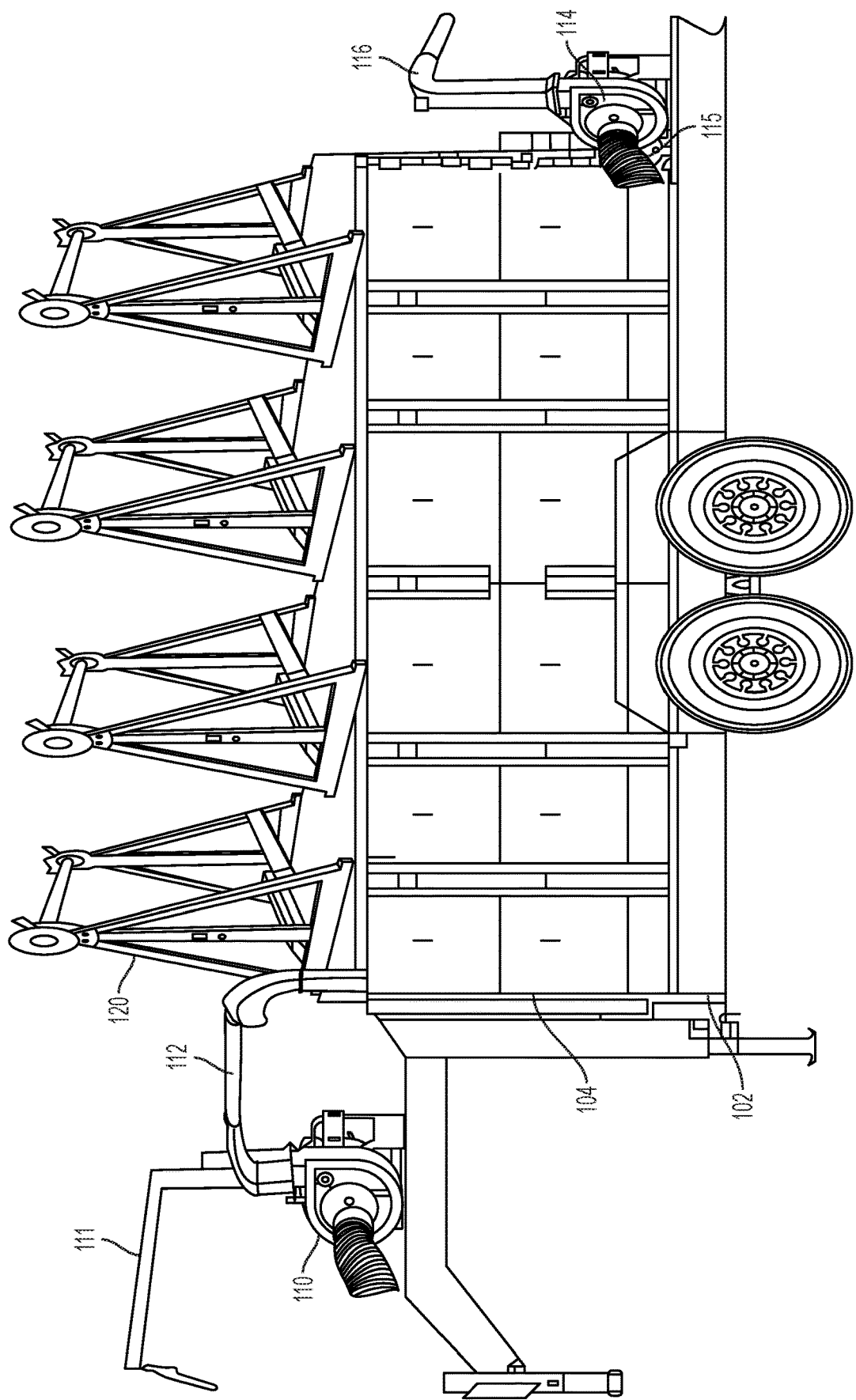
FIG. 1 illustrates a side view of a multifunctional reel carrier, spoil material handling container device.
Figure 2:
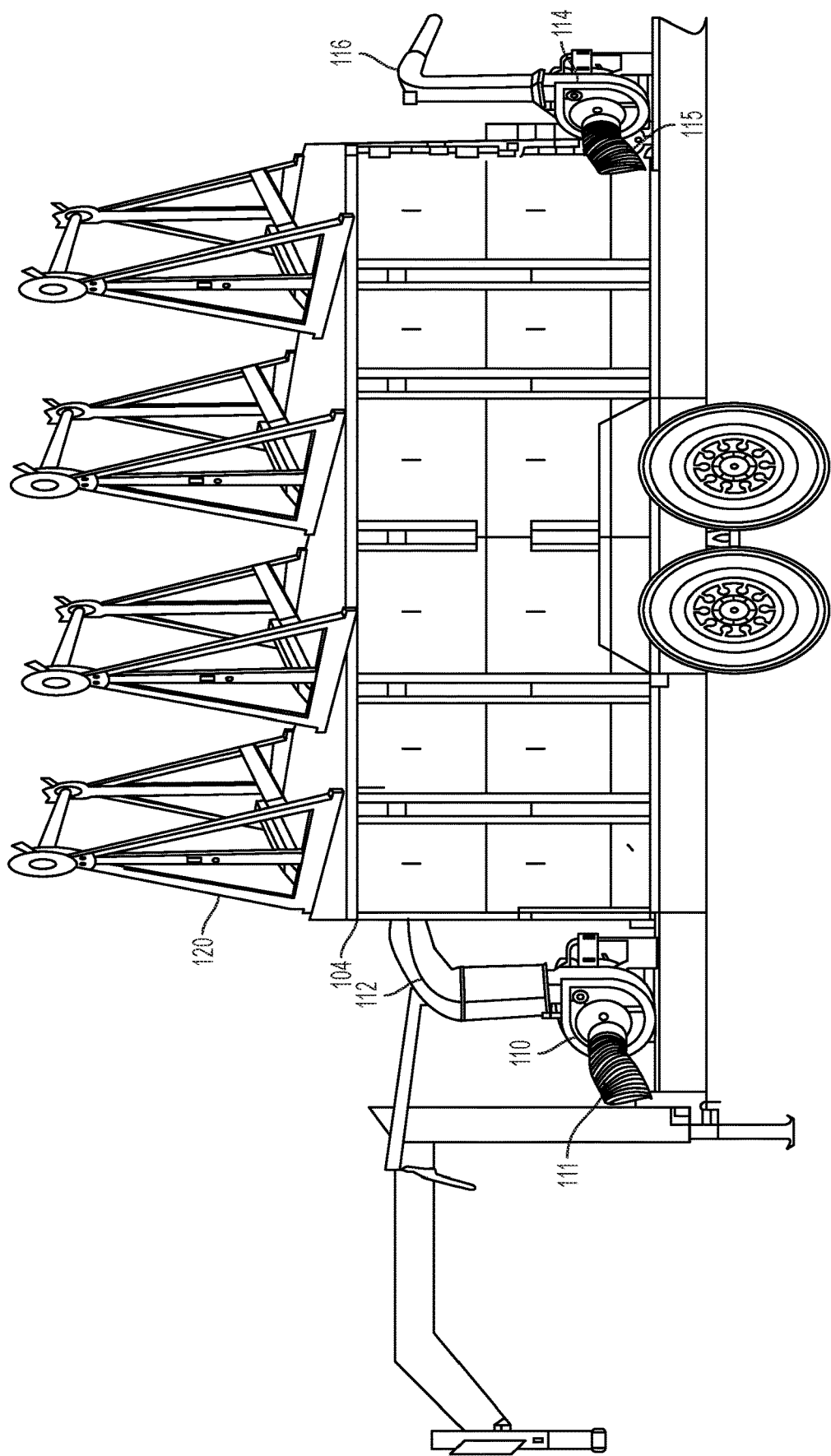
FIG. 2 illustrates a side view of a multifunctional reel carrier, spoil material handling container device.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention with reference to the attached non-limiting figures.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

As shown in FIGS. 1-4, the multifunctional reel carrier, spoil material handling container device 100 comprises a trader or truck bed 102 so that the multifunctional reel carrier, spoil material handling container device 100 can be moved along with a micro trencher 2. The size of the trailer or bed 102 can be any desired size, for example from 5 to 40 feet. The multifunctional reel carrier, spoil material handling container device 100 includes at least a first container 104 sized to hold spoil 12 created by the saw (such as a cutting wheel) 10 cutting a microtrench 11, for example from 50 to 4,000 cubic feet in size. The first container 104 is constructed to hold the spoil 12. A first vacuum device 110 has an inlet 111 disposed at the micro trencher 2 to suck up the spoil 12, and optionally to also remove spoil 12 from the microtrench 11. An outlet 112 of the first vacuum device 110 deposits the spoil 12 into the first container 104. A second vacuum device 114 has an inlet 115 connected to the first container 104 to remove spoil from the first container 104 and an outlet 116 connected to a fill device 200. Thus, the multifunctional reel carrier, spoil material handling container device 100 is constructed to move spoil 12 from the micro trencher 2 to the first container 104 and then to the fill device 200. Instead of the fill device 200, the second vacuum device 114 can move the spoil to a truck or other vehicle 300 for removal of the spoil from the job site or to recycle the spoil back into the microtrench. The first container 104 has at least one outlet 118 can have a filter to prevent spoil from being ejected into the air. The outlet 118 can allow air to enter or leave the first container 104. The reel loader 104 includes at least one reel holder 120 constructed to hold a reel of cable or innerduct/microduct 121. The multifunctional reel carrier, spoil material handling container device 100 preferably includes a plurality of reel holders that can be adjusted in height and moved manually or mechanically/hydraulically from front to back, back to front, side to side, or up and down.

To facilitate vacuuming of the spoil 12 from the container 104, different methods to move the spoil 12 within the container 104 can be utilized. Examples of suitable methods include, but are not limited to a sloping floor 119 or mechanical moving systems 117 such as augers or conveyors or a tilting mechanism such as a dump body 129. Alternatively, an inlet moving device 123 for moving an inlet hose 127 within the container 104 can be utilized. In another embodiment the outlet 112 can be connected to the inlet 115 using a connection such as a valve.

As shown in FIG. 7, the reel holders 120 can be adjustable in height and location either manually or mechanically 143, such as using a tread or locking rail system, to accommodate different size reels. Multiple reel holders 120 can be utilized so that multiple cables and/or ducts 121 can be laid in the trench 11 simultaneously. The reel holders can also have manual or mechanical/automatic winding systems 145 allowing the cable, innderduct/microduct to be easily removed from the reels 121 and placed in the trench 11.

Any suitable micro trencher 2 can be utilized in the present invention. Non-limiting examples of suitable micro trenchers include those made and sold by Ditch Witch, Vermeer, and Marais. A micro trencher is a "small rock wheel" specially designed for work in rural or urban areas. The micro trencher 2 is fitted with a saw 10 that cuts a microtrench 11 with smaller dimensions than can be achieved with conventional trench digging equipment. Microtrench 11 widths usually range from about 6 mm to 130 mm (¼ to 5 inches) with a depth of 500 mm (20 inches)

or less. Other widths and depths can be used as desired. For example, up to 30 inches deep can be used.

With a micro trencher 2, the structure of the road, sidewalk, driveway, or path is maintained and there is no associated damage to the road. Owing to the reduced trench size, the volume of waste material excavated is also reduced. Micro trenchers 2 are used to minimize traffic or pedestrian disturbance during cable laying. A micro trencher 2 can work on sidewalks or in narrow streets of cities, and can cut harder ground than a chain trencher, including cutting through for example but not limited to solid stone, concrete, and asphalt. The term ground as used herein includes, soil, asphalt, stone, concrete, grass, dirt, sand, brick, cobblestone, or any other material the trench 11 is cut into and the optical fiber buried within.

Figure 4:
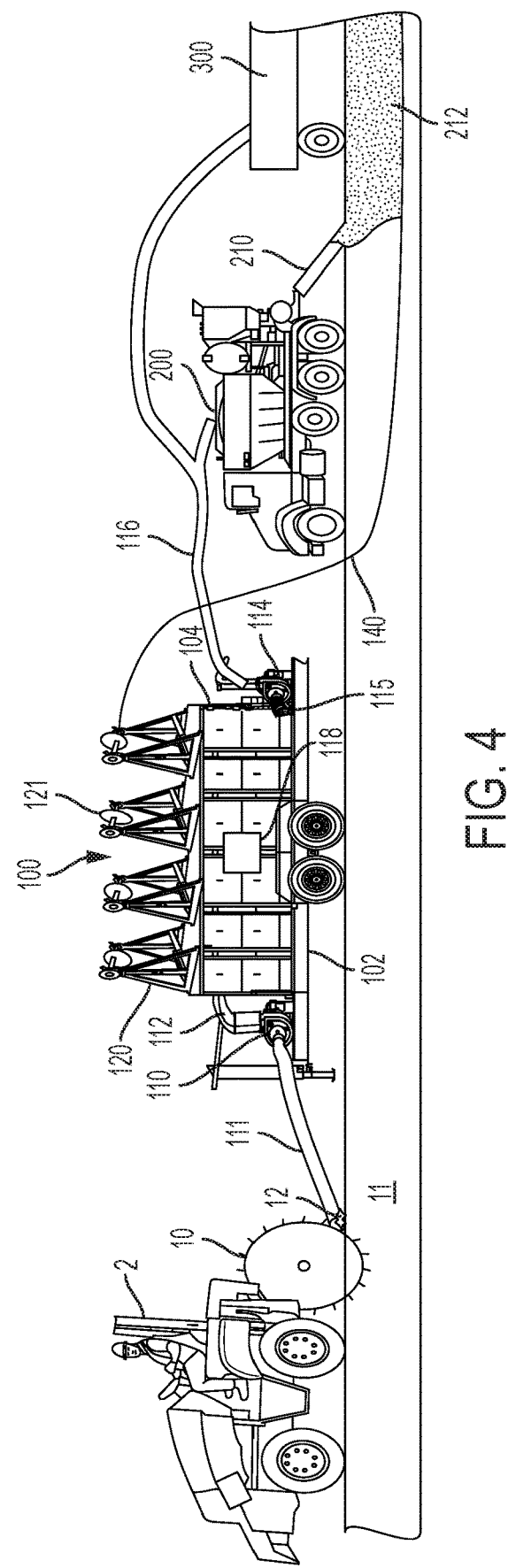
FIG. 4 illustrates a view of the multifunctional reel carrier, spoil material handling container device connected to a micro trencher and a fill device.
Figure 5:
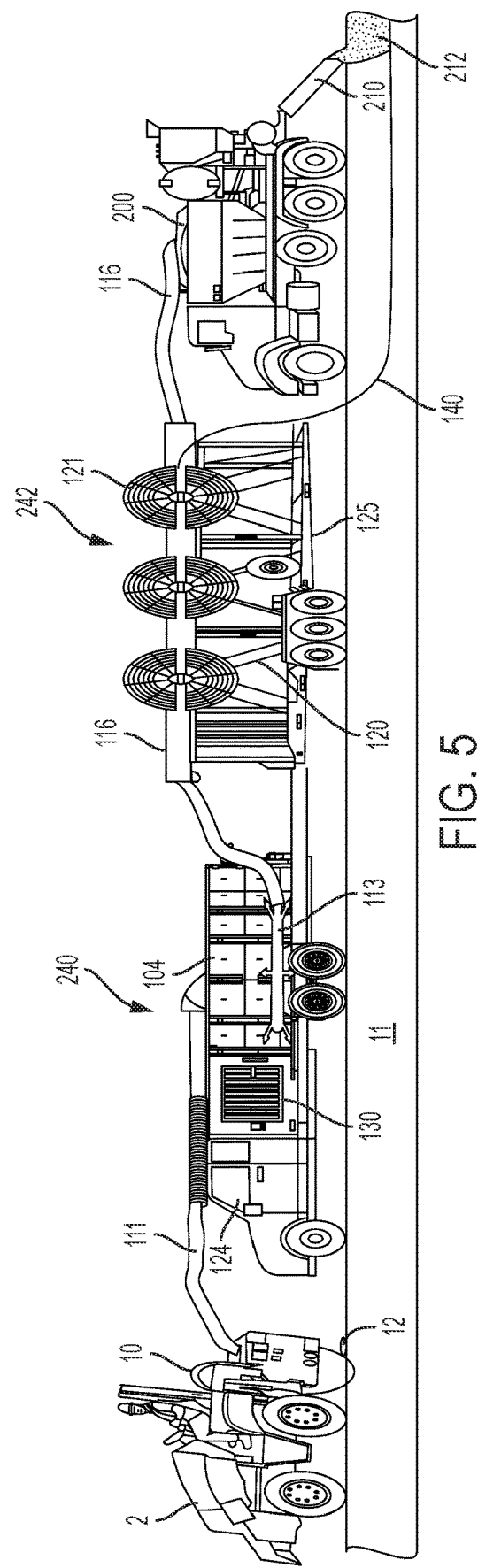
FIG. 5 illustrates a view of another embodiment of the multifunctional reel carrier, spoil material handling container device connected to a micro trencher and a fill device.
Figure 6B:
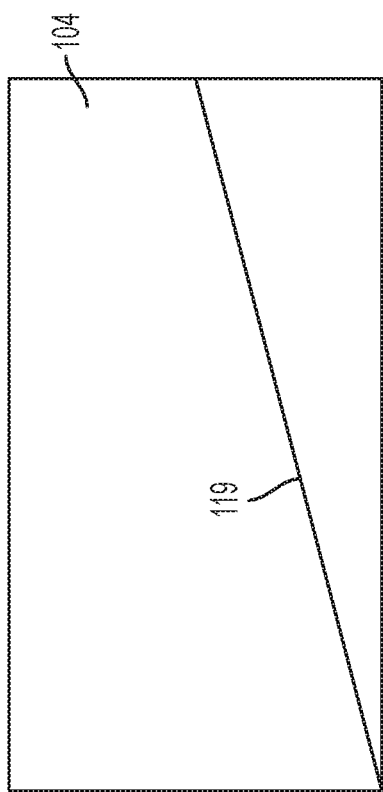
FIG. 6B illustrates a container device having a sloping floor.
Figure 6C:
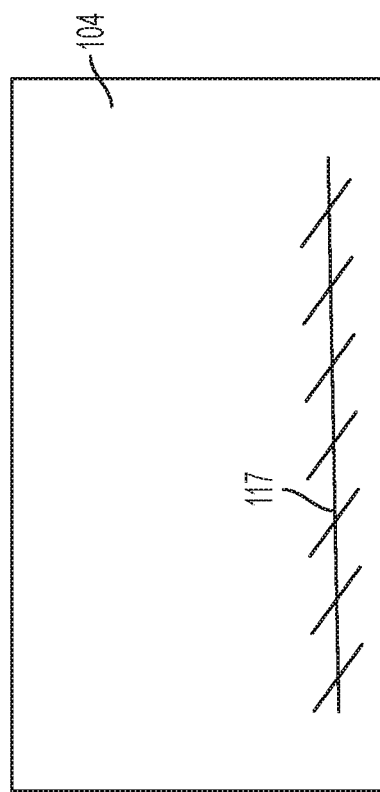
FIG. 6C illustrates a container device having a mechanical moving system.
Figure 8B:
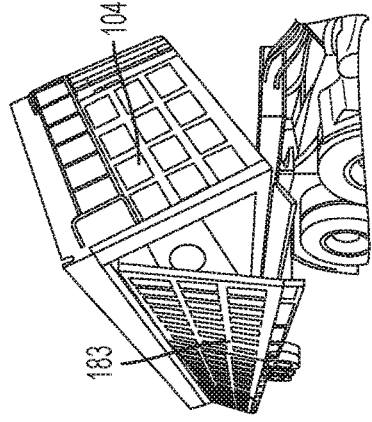
FIG. 8B illustrates an embodiment of the truck 124 showing how the container device can be dumped.
Figure 8A:
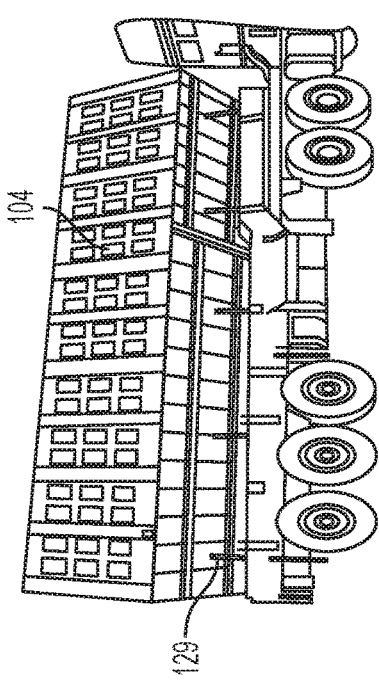
FIG. 8A illustrates an embodiment of the truck 124 showing how the container device can be dumped.
Figure 8C:
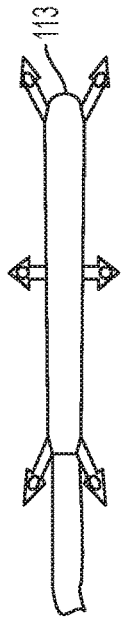
FIG. 8C illustrates an intake system for the container device.
Figure 8E:
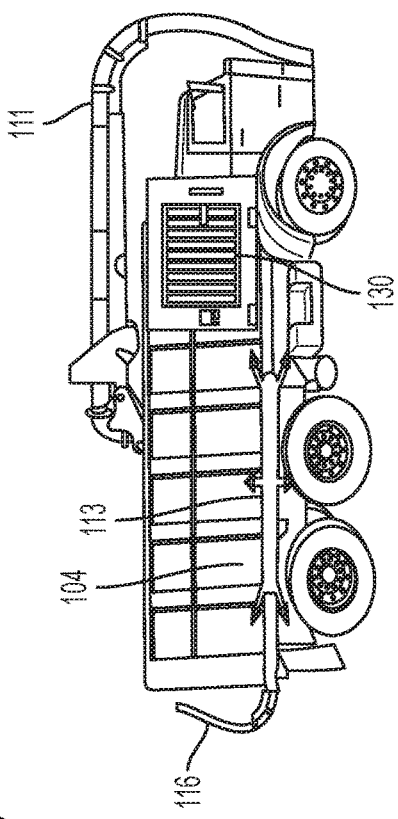
FIG. 8E illustrates an intake system for the container device
Figure 8D:
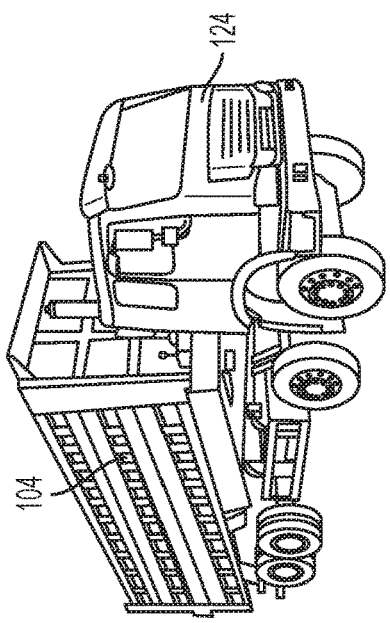
FIG. 8D illustrates an embodiment of the truck 124 showing how the container device can be dumped.
Figure 11A:
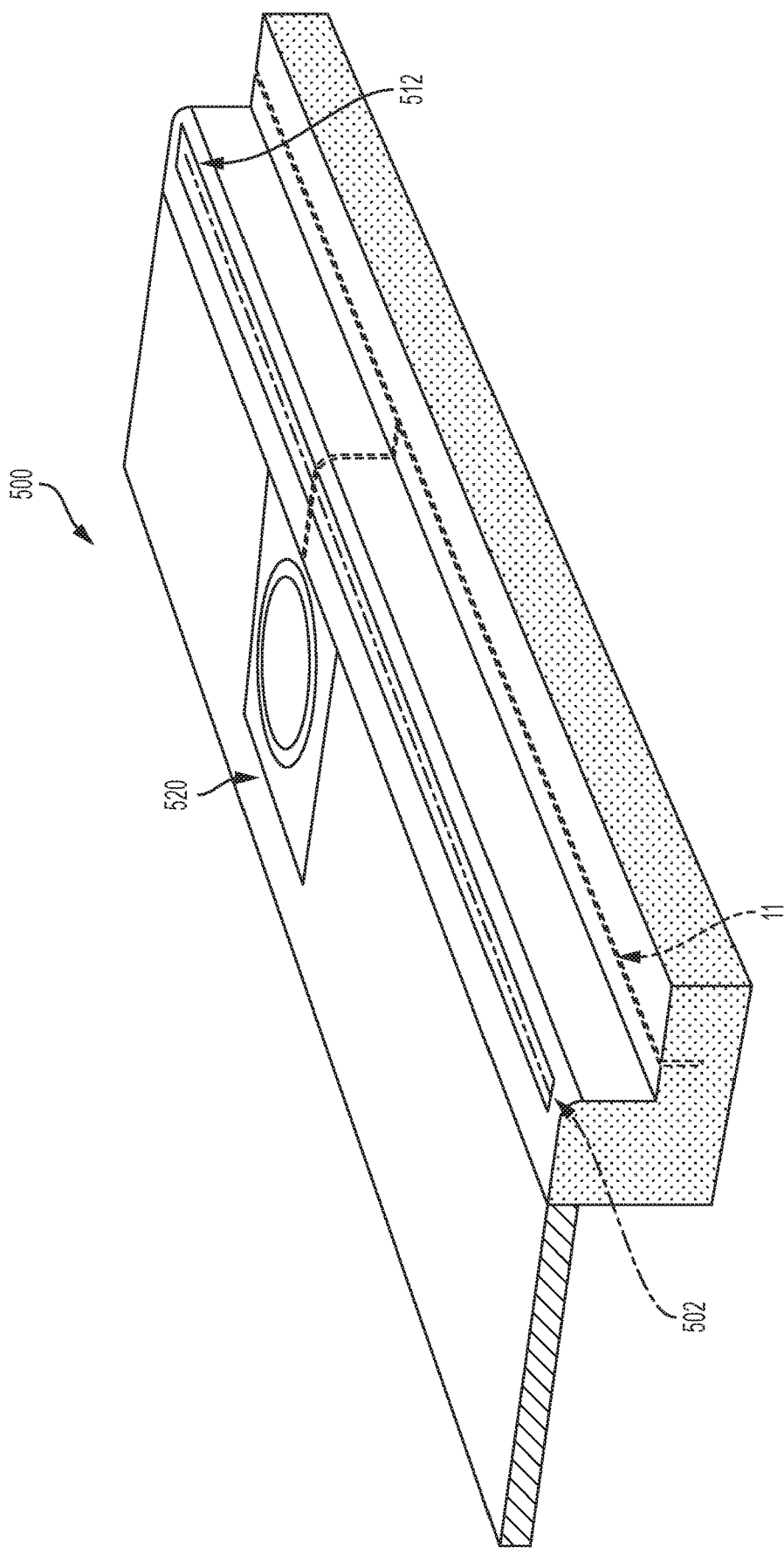
FIG. 11A illustrates a sidewalk and curb having a temporary optical fiber network and micro-trenches cut to move the temporary optical fiber network into a permanent position.
Figure 11B:
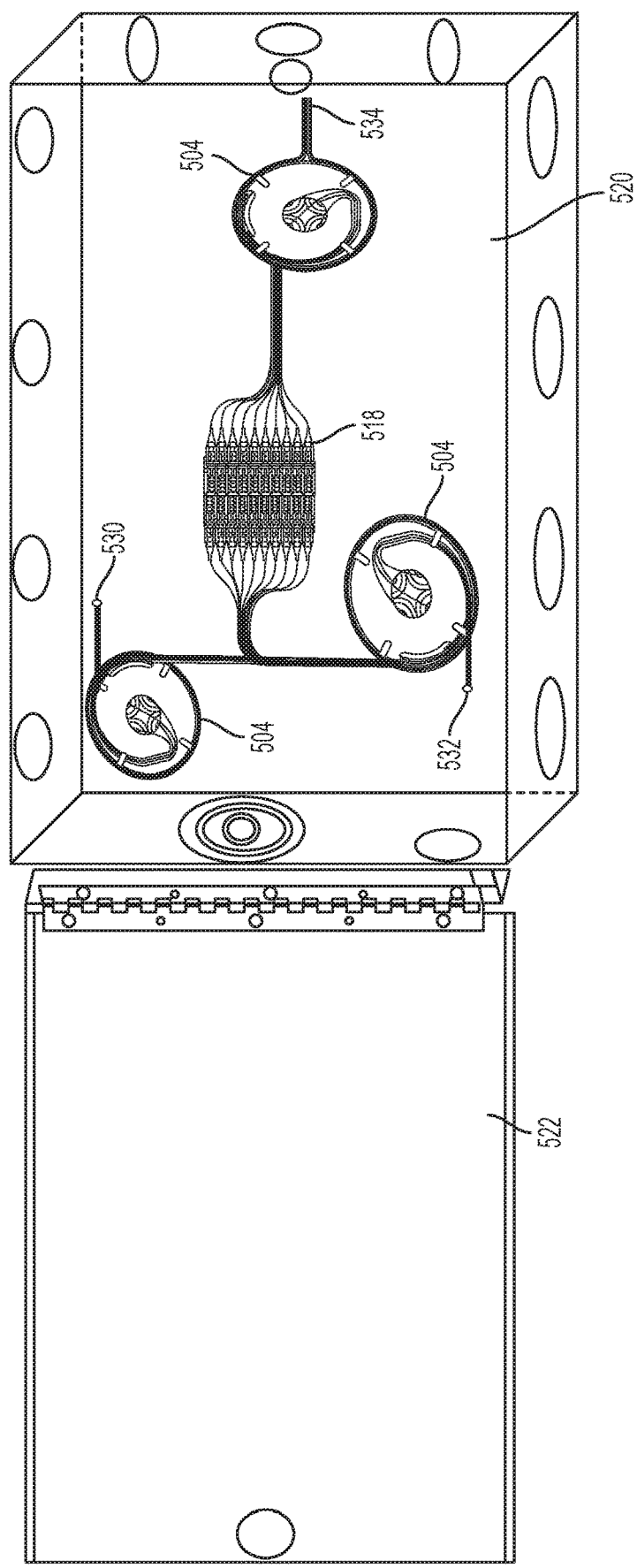
FIG. 11B illustrates a box having optical fiber that can be dispensed as needed.
Figure 11C:
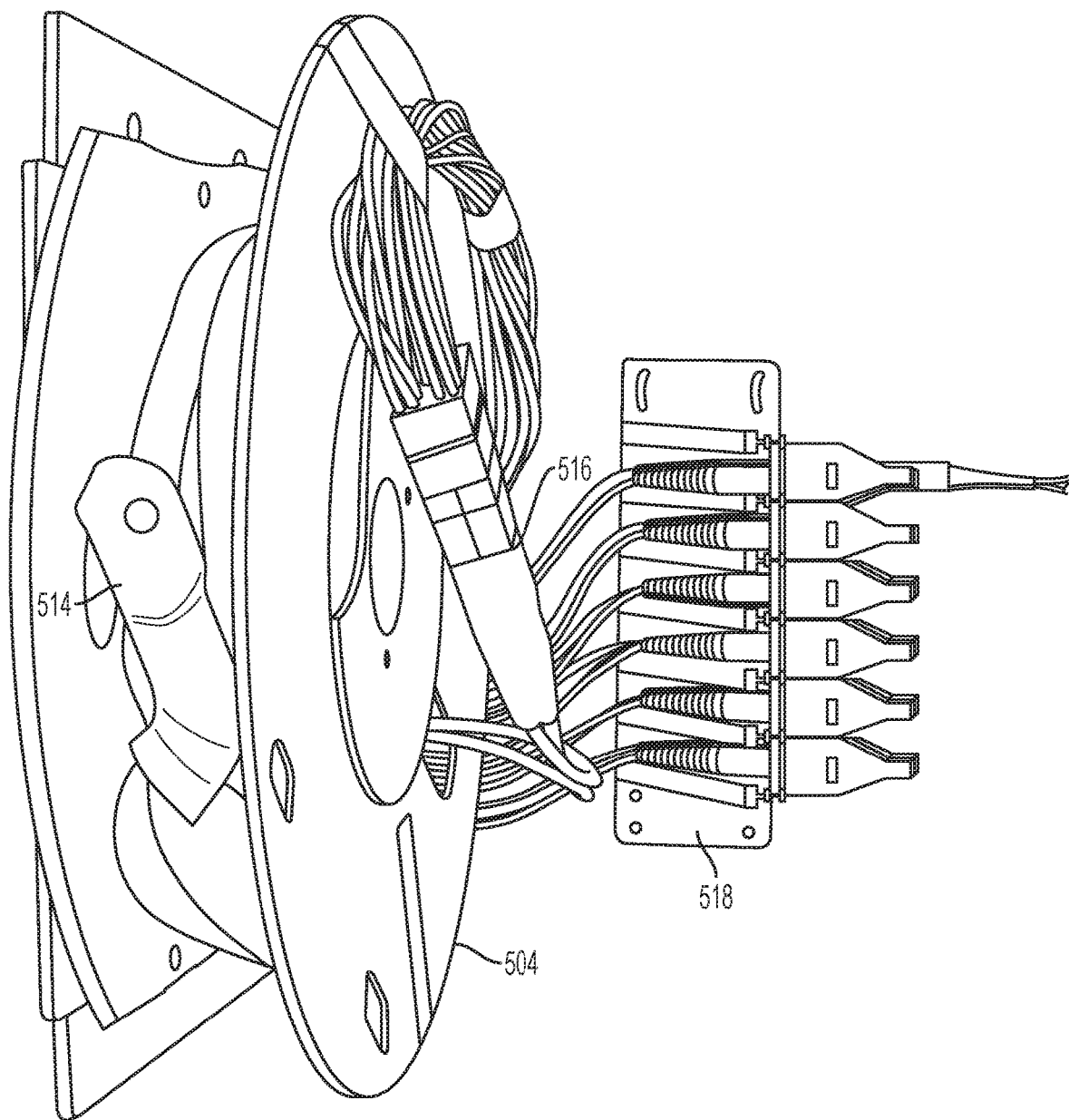
FIG. 11C illustrates a reel of optical fiber connected to a splitter.
Figure 11D:
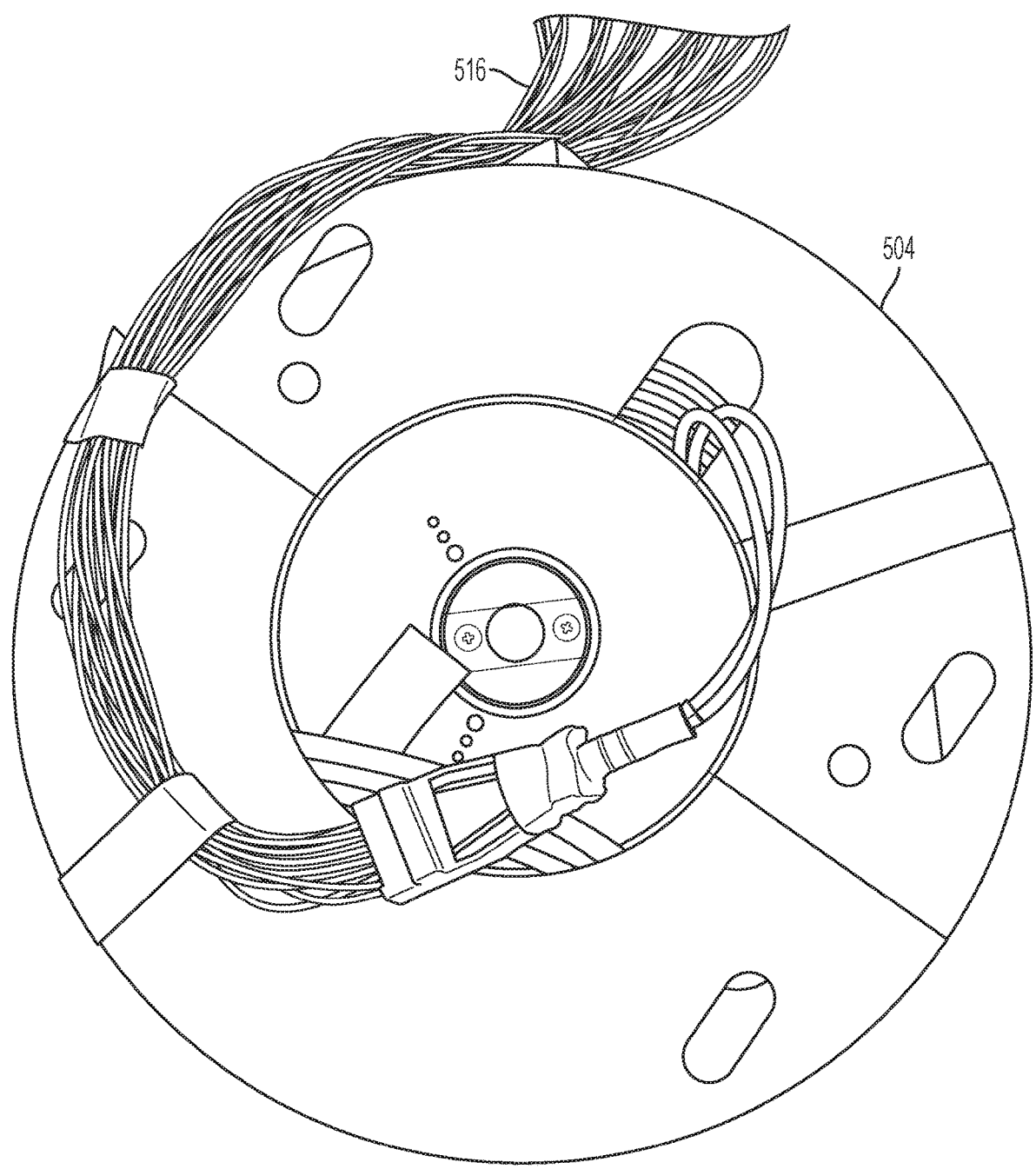
FIG. 11D illustrates a reel of optical fiber connected to a splitter.
Figure 11E:
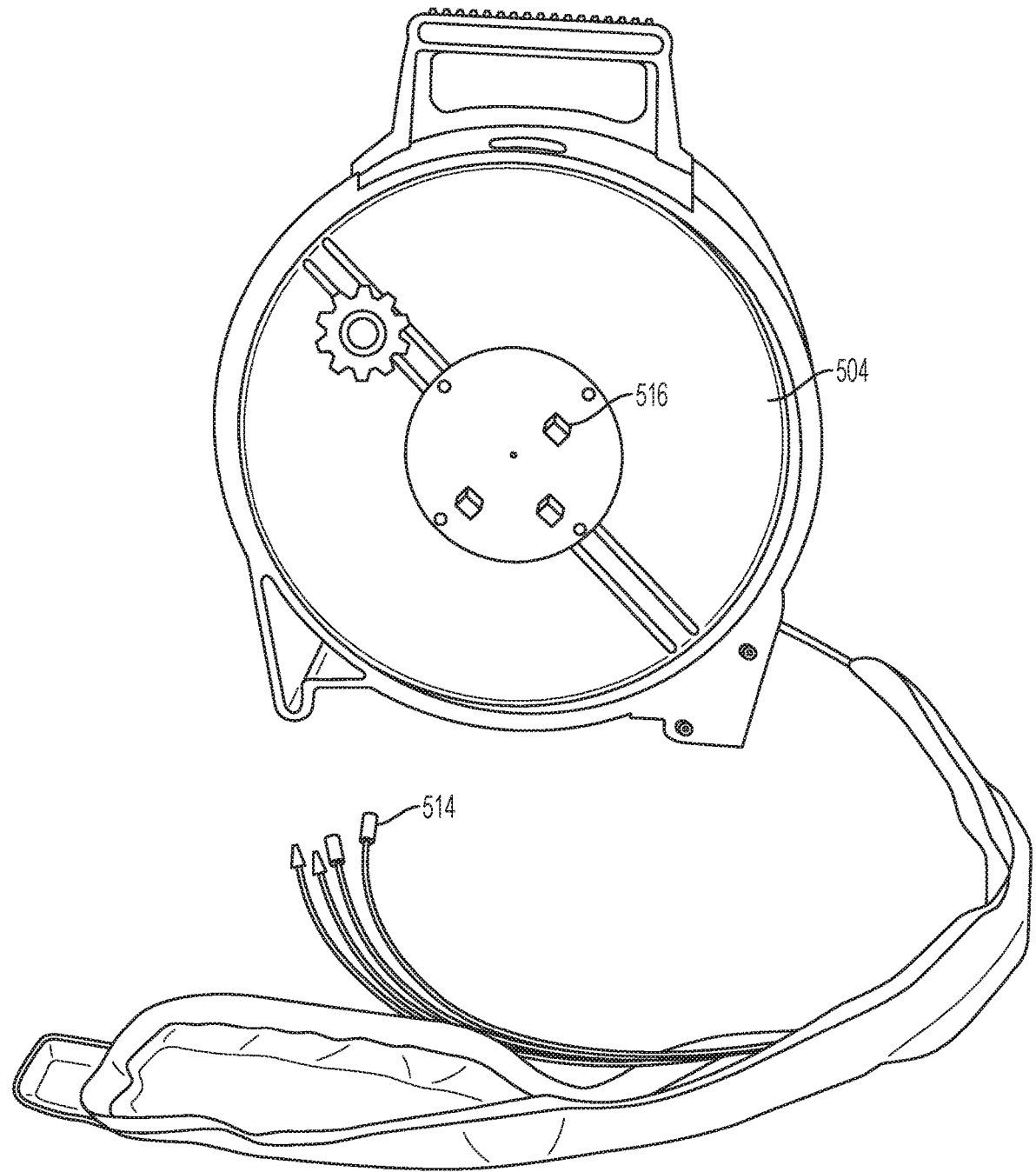
FIG. 11E illustrates a reel of optical fiber.
Figure 11F:
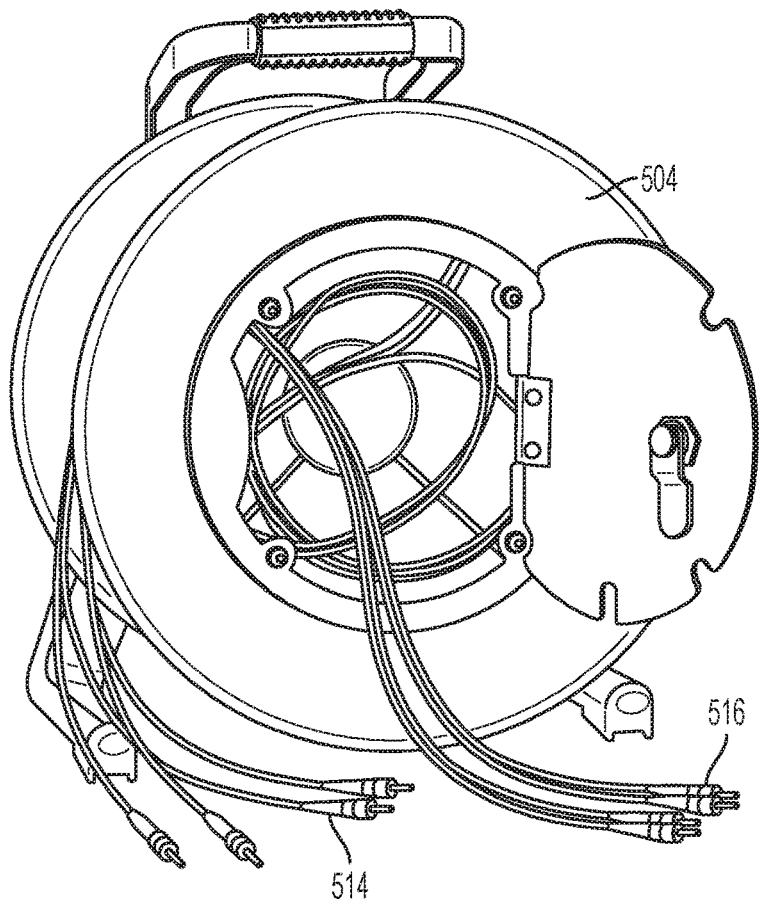
FIG. 11F illustrates a reel of optical fiber.
Figure 11G:
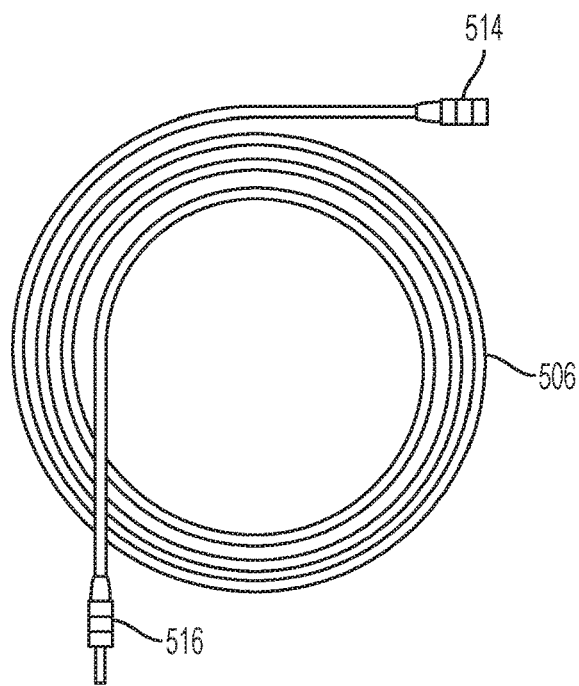
FIG. 11G illustrates a loose coil of optical fiber.

FIG. 5 shows another exemplary embodiment of the present invention. A micro trencher 2 is used to cut a micro trench 11. The multifunctional reel carrier, spoil material handling container device 100 is separated into a container carrier device 240 comprising a truck 124 and reel carrier device 242 comprising a trailer 125 so that the container carrier device 240 and reel carrier device 242 can be moved along with a micro trencher 2. The trailer 125 can be a separate truck if desired instead of a trailer. The container carrier device 240 includes at least a first container 104 sized to hold spoil 12 created by the saw 10 cutting a microtrench 11. The first container 104 is constructed to hold the spoil 12. A vacuum device 130 has an inlet 111 disposed at the micro trencher 2 to suck up the spoil 12, and optionally to also remove spoil 12 from the microtrench 11. The inlet 111 comprises a hose. The inlet 111 can be connected to the container 104 and the vacuum device 130 connected to the container 104 so that when a vacuum is pulled on the container 104, the spoil 12 is sucked through the inlet 111 into the container 104. In this instance, the container 104 can be constructed to substantially maintain its shape when a vacuum is pulled. A safety valve can be present to prevent too much of a vacuum being pulled on the container 104. Alternatively, the inlet 111 can be connected to the vacuum device 130 and the spoil deposited into the container 104. The vacuum device 130 has an intake system 113 or inlet 127 inside the container 104 to suck up spoil 12 inside the container 104. An outlet 116 of the vacuum device 130 transfers the spoil 12 to the fill device 200 or to another vehicle 300 as shown in FIG. 4. Alternatively, the truck 124 can be fitted with two vacuum devices 110 and 114 as shown in FIG. 4 in place of the single vacuum device 130. Thus, the container carrier device 240 is constructed to move spoil 12 from the micro trencher 2 to the first container 104 and then to the fill device 200. The reel carrier device 242 comprises at least one reel holder 120.

As shown in FIGS. 6A-6E, the container 104 can be any desired shape, such as square, rectangular, or tubular and hold anywhere from 1 cu yard of spoil to 100 yds of spoil 12. The spoil intake, inlet 111, can be any desired location on the container 104, such as on the top, back, front or side of the container 104 or connected to the container 104 via the vacuum 110 or 130. Spoil removal intake system 113 or inlet 127 can be located in any desired position in the container 104, such as on the bottom, side, front or rear. The intake system 113 can have one large opening or multiple smaller openings spread out to remove the spoil 12 evenly from the container 104. The container 104 can have an opening and a lifting device 129, such as hydraulics, to lift or tilt the container 104 to move the spoil within the container 104 or to remove the spoil from the container. For example, the container 104 can be part of dump truck. Thus, the container 104 can have the ability to off load spoil 12 by tilting to either side to dump the spoil 12 through a door 183 or can be raised, expelling the spoil 12 from the rear. The side wall(s) and or back of the container 104 can be locked manually or hydraulically to ensure no spoil 12 or dust can leak out during the vacuum intake or outtake process. A fill gauge 160 can be installed showing how full the container 104 is. An air valve 163 can be installed to adjust the air pressure inside of the container 104, such as allowing air to be removed during and after operation when spoil 12 passes through the vacuum device and then into container 104 as shown in FIG. 4, or to allow air into the container 104 to prevent too low of a vacuum in the container 104 when the spoil 12 is sucked directly into the container as shown in FIG. 5. An air filter 167 can be installed allowing air to be released reducing pressure build up in the container 104 while containing dust inside of the container 104. Pressure gauge 161 can be installed to monitor the pressure in the container 104. The interior of the container 104 can have a stationary slant in the bed 119 or a mechanical bed 117 to help move the spoil 12 to a designated release point.

A conventional vacuum truck can be modified to remove spoil 12 from the container 104 by adding the intake system 113, adding an outlet 116 to fill device 200, and modifying the vacuum device 130 and/or adding an additional vacuum device to transfer spoil 12 from the saw 10 to the container 104 and to the fill device 200. FIGS. 8A-8E illustrate a modified vacuum dump truck 124.

The reel loader includes at least one reel holder 120 constructed to hold a reel of cable or innerduct/microduct 121. The multifunctional reel carrier, spoil material handling container 100 and the reel carrier 240 each preferably includes a plurality of reel holders that can be adjusted in height 143 and moved manually or mechanically/hydraulically from front to back, back to front, side to side, or up and down. To reduce the overall height of the device, the reel holders 120 can be mounted on a separate trailer 125 that is towed by the truck 124.

The first vacuum device 110 and second vacuum device 114, and vacuum device 130 are constructed to suck up and expel the spoil. Commercial examples of suitable vacuum devices 110, 114, 130 are those made by SCAG Giant Vac., DR Power, and Billy Goat. The inlets 111, 115, 130 and outlets 112, 116 of the vacuum devices can be conventional hoses, such as 4 to 16 inch diameter hoses. The vacuum devices 110, 114 can also have a water misting system 148 that is attached to a 150 water tank. The misting system 148 can be engaged manually or electronically programmed to emit a water mist inside the container 104 minimizing dust. The vacuum devices 110, 114, 130 can run on gas, diesel, electric or solar power. The vacuum devices 110, 114, 130 can have a steel impeller inside that will allow for any debris to be pulverized or chopped into smaller pieces. The vacuum devices 110, 114, 130 can be mounted on a truck or can be on a trailer and hitched to a vehicle for transportation. The vacuum devices 110, 114, 130 can be hooked up directly to a vehicle gas tank in order to eliminate a separate fueling mechanism. The vacuum fuel tank can have its own independent gas tank fueling mechanism. If one vacuum is used to do both intake and outtake, a secondary outtake valve 156 can be used for the spoil to be expelled. The intake valve 154 may need to be closed or shut off so no spoils will be expelled out of the saw connection. The intake system 113 can also have a valve 152 for controlling the amount of spoil 12 to be removed from the container 104. The vacuum can have a CFM (Cubic Feet per Minute) throttle allowing the intake and outtake speeds to be adjusted based on the operators requirements.

Figure 3:
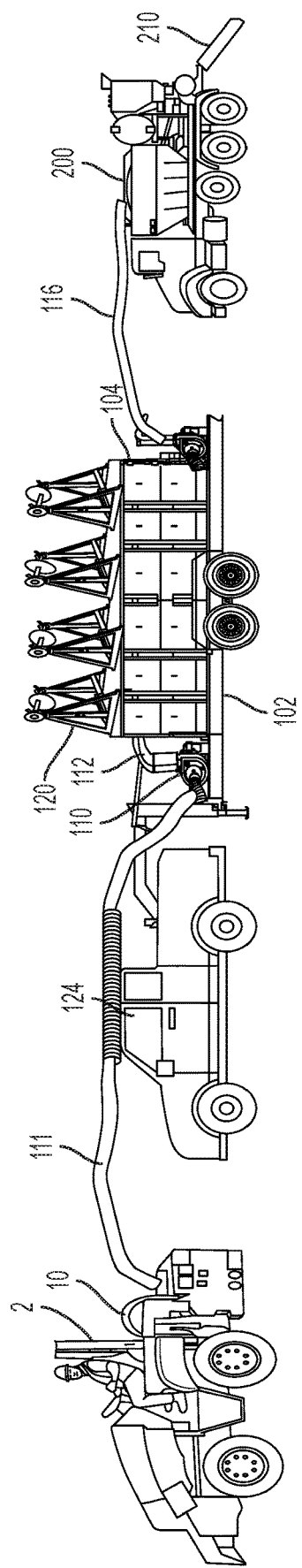
FIG. 3 illustrates a view of the multifunctional reel carrier, spoil material handling container device connected to a micro trencher and a fill device.

The present invention also relates to a method of laying cable and/or innerduct/microduct 140. An exemplary method is shown in FIGS. 3 and 4. A micro trencher 2 is used to dig a trench 11 and create spoil 12. The first vacuum device 110 is used to vacuum the spoil 12 from the trencher 2, preferably also from the trench 11, and deposit the spoil 12 in the first container 104. Cable or duct 140 is spooled from the reel 121 and laid in the trench 11. A fill device 200 is then used to fill the trench 11 with fill 212 from an outlet 210 to cover the cable or duct 140. The second vacuum device 114 can be used to vacuum at least a portion of the spoil 12 from the first container 104 and transfer the spoil 12 to the fill device 200 to form the fill 212 from the spoil 12. The trench can be filled with one or more of the following examples, but not limited to, cement, grout, sand, self-leveling sealer, expansion joint, epoxy which is inserted into the trench on top of the cable or innerduct/microduct.

A further exemplary method is shown in FIG. 5. A micro trencher 2 is used to dig a trench 11 and create spoil 12. The vacuum device 130 is used to vacuum the spoil 12 from the micro trencher 2, preferably also from the trench 11, and deposit the spoil 12 in the first container 104. Cable or duct 140 is spooled from the reel 121 and laid in the trench 11. A fill device 200 is then used to fill the trench 11 with fill 212 from an outlet 210 to cover the cable or duct 140. The vacuum device 130 can be used to vacuum at least a portion of the spoil 12 from the first container 104 and transfer the spoil 12 to the fill device 200 to form the fill 212 from the spoil 12.

One or more spoil transport devices are utilized in the present invention to transfer spoil from the micro trencher 2, and optionally also the trench 11, and move the spoil 12 to first container 104, fill device 200, trucks, and/or any other devices utilized in the present invention. FIGS. 1-8 illustrate embodiments of the spoil transport devices comprising vacuum devices, as discussed above. Instead of vacuum devices, the spoil transport devices can be a conveyor 300, a screw 302, or any other spoil moving device as shown in FIGS. 9A and 9B. Preferably, the spoil transport device for removing spoil from the micro trencher 2 and trench 11 comprises a vacuum device.

A particularly preferred fill 212 comprise bonding agent comprising a polymer additive, concrete mixture and a coloring agent to complete the micro trench or shallow trench backfilling operation. The spoil 12 can be used as part of the concrete mixture. A commercial example of the bonding agent is SC polymer by SureCrete, which can be found at http://www.surecretedesign.com/product/liquid-concrete-polymer/. The bonding agent can be added to the concrete backfill mixture in conjunction with substituting sand and/or spoil for conventional gravel aggregate to allow for use in the micro trench or shallow narrow trench application. By altering the slump or viscosity of the concrete by altering the water content we were able to control the flow rate and application of the mixture into the narrow trench. There are other commercially available bonding agents that will perform similar the product above. Bonding agents for concrete are well-known in the art and any desired bonding agent can be utilized.

One of ordinary skill in the art will be able to adjust the viscosity of the bonding agent/concrete mixture fill 212 so that the fill 212 can flow into the shallow narrow trench, such as less than 2" in width and from 2" to 20" in depth.

In comparison, previous to the bonding agent/concrete mixture, we used concrete mixtures or asphalt mixtures as a the primary backfill in the trench and then a chemical compound was utilized over top of the mixture to seal the roadway from water intrusion. By using the concrete with the bonding agent in the trench we have eliminated the need for multiple passes as the bonding agent will bond to the trench and provide the necessary seal to the roadway. The chemical compounds utilized previously in sealing the trenches are costly, slow to deploy in some cases, and was required installation crews to complete multiple steps in completing an operation. Furthermore, by coloring the bonding agent/concrete mixture to match the roadway color we have further reduced the cost of installation by completing the backfill in once step and the coloring is similar to that of an existing roadway. The bonding agent provided the adhesion to the existing surface which in the past was completed with different much more expensive chemicals. The bonding agent/concrete mixture allows for the installation of a cement based product with adhesive characteristics. Filling a microtrench in one step using a color matched bonding agent/concrete mixture instead of multiple steps has not been done heretofore.

By pumping or using commercially available concrete installation tools, substituting sand and/or spoil for conventional stone aggregate, regulating the viscosity of the concrete product by adjusting the water content, adding the coloring agent to the concrete, and adding a bonding agent, we have developed a method of completing the shallow narrow trench that is far faster and significantly more cost effective than prior solutions that are utilized in the industry. This allows for significant cost savings compared to other methods of backfilling a shallow narrow trench.

The figures show exemplary devices for practicing the claimed invention that are now being used by the inventor to install optical fiber cable for Google. The present invention allows surprisingly far faster and more efficient installation of the optical fiber, for example multiple crews installing optical fiber cable for Google are installing from 4000 to 6000 feet of optical fiber cable per day. We believe up to 7000 feet per day can be acheived. Conventional methods only allow about 1000 feet per day. The present invention causes far less disruption of roads and pathways. The present invention can also return the roads and pathways to their original state with the same colored fill. The present invention is not limited to the order of the devices and methods illustrated in the figures and any desired order of devices and steps can be utilized to practice the claimed invention.

In another embodiment, a marker line 400 as shown in FIG. 10 can be applied to the surface 402 of the ground to be cut by the micro trencher. In this manner, utilities can see where the micro trench 11 will be formed so that the utilities can mark locations of their infrastructure 410, such as electrical lines, optical cable, water lines, sewar lines, or any other infrastructure. The marker line 400 can have start 406 and stop 408 locations, and can identify the depth. The marker line can be a solid line, dashed, dotted, contain letters, numbers or symbols, and can be any desired color with white being the most preferred.

In another embodiment of the invention, a temporary fiber optic cable network can be laid out on the surface and utilized as a temporary optical fiber network. The temporary optical fiber network can be protected with any desired protection device, such as conduit, tarps, tape or other type of cover, that can be skid proof, and constructed for outdoor use which can withstand foot and vehicle traffic. For example, the tape can be heated to activate an adhesive, or peelstick, silicone, epoxy glue or any desired type of adhesive. The surface can be a street, sidewalk, driveway, asphalt, concrete, dirt, interior floor, or any other desired surface.

As shown in FIGS. 11A-11G, the temporary optical fiber network 500 includes at least one optical fiber cable 502, and preferably a plurality of optical fiber cables 502. The optical fiber cables 502 can be coiled on a reel 504 or loosely coiled 506. Each end of the optical fiber cables 502 can have a first connector 514 installed thereon, or a connector can be installed in the field by a technician. The optical fiber cable 502 can be uncoiled to a desired distance and a protection device 512, such as tape, applied thereover. A first end of the optical fiber cable 502 can be connected to a desired feed using the first connector 514. The second end of the coil can be connected to any desired location using the second connector 516. The connectors 514, 516 can be connected to splitters 518 or any desired device. The desired location can be dwelling, sporting event, military site, or any other desired location.

The reel 504 and loose coil 506 allows the fiber cable 502 to be deployed to any desired length and also to be recoiled if necessary. The second end connector 516 can be constructed so that the second end connector 516 can remain connected while the reel 504 is rotated, similar in design to the Camplex reels. Alternatively, the second end connector 516 can be disconnected while the reel 504 is rotated so that the connector 516 can rotate with the reel 504. The loose coil 506 or wound reel 504 can be installed within a box 520. The box 520 can contain multiple reels 504 or coils 506. The box 520 can be formed from plastic, metal, galvanized, stainless steel, concrete, fiberglass, rubber or any other suitable material. The reels 504 can be mounted on bracket(s) or rod(s) 522 that can be placed from side to side (horizontal) or from bottom to top (vertical). Spacers can be placed in between the reels so they can spin independently of each other. The box 520 can have any desired shape, such as tubular, square, triangular, rectangular or any other desired shape. The box 520 can have a lid or door that can be locked or otherwise secured. The box 520 can be mounted on a roller. The box 520 can be buried, mounted pole, or secured in any desired location.

The box 520 can have one or more optical fiber extenders, such as reels 504 or loose coils 506, for input 534 to allow optical fiber cable 502 to be unwound for a temporary or final installation. The box 520 can have one or more optical fiber extenders, such as reels 504 or loose coils 506, for output 532 to allow optical fiber cable 502 to be unwound for a connection(s) to and additional box(es) 520 for temporary or final installation. The box 520 can have one or more optical fiber extenders, such as reels 504 or coils 506, for fiber drops 530 to allow optical fiber cable 502 to be unwound for connections to customers for temporary or final installation.

After using the temporary optical fiber network 500, once the desired location of the optical fiber 502 and box(es) 520 are known, the optical fiber network can be made permanent by removing the protection device 512, creating slack in the optical fiber 502 by uncoiling the optical fiber from the extenders in the box 520, creating a microtrench as described herein, burying the optical fiber and covering the optical fiber with a fill, and permanently mounting or burying the box(s) 520.

Fiber optic converter/extenders on a 1000 foot reel are known. Commercial examples are cmx-tacngo-sdi tac-n-go 3G sdi fiber optic converter/extender, TAC1 Simplex LC fiber optic tactical cable reel, and Tac-N-Go fiber optic by Camplex. www.camplex.com. These are field deployable optical fiber reel systems. Corning systems also provides fiber optic convert/extenders at any desired length, any number of connectors, such as 1 strand to 864 strands, usually from 6 strands to 432 strands, and the fiber optic cables can be connectorized in field or already have a connector applied. The known reels can be utilized in the present box 520 and permanently mounted.

The temporary taped optical fiber installation can be utilized to provide an optical fiber network 500 to a desired user, such as a neighborhood, business, sporting event, military complex, or any other desired location. Once the desired location of the optical fiber is determined, slack can be provided in the optical fiber 502, the tape 512 removed, a nanotrench or microtrench 11 can be formed, the optical fiber 502 installed in the trench 11, and then the trench 11 can be filled 212 using any desired method, such as the methods described herein above. Instead of the microtrench 11, the optical fiber can be mounted in conduits, drills, core drill, hung, walls, hydrovac, and/or directional drill. If the optical fiber 502 is on a reel 504 within the box 520, the box 520 and reel 504 can be permanently mounted. In addition to the fill 212 described above, the buried fiber cable 502 can be covered with self leveling grout, caulking, asphalt, tar, SL1, cold patch, concrete, sterling Loyd, of other fill products.

The present invention includes a system, method and device for connecting a fiber optic cable 502, by the second connector 516, to a feeder line that supplies one or more signal types, such as television (TV), data (e.g., internet access), and telephone (fixed wireline or cellular), to a plurality of units (offices or dwellings) in a multi-unit building. In some example embodiments, the system, method and device may be used to connect a new feeder line to existing internal wiring (twisted pair, coaxial cable, etc.). In addition or alternatively, the device can be used to connect a feeder line to a wifi, local network, telephone network, or any other desired connection within the building. The invention can also be used to supply a neighborhood. For example, if coax is already connected to an existing neighborhood, the coax can be connected to cards in a box and an optical fiber cable 502 can be used to input a feeder line into the input 534 of the box 520 so that coax does not have to be replaced saving considerable time and expense. In this manner the box can be placed on a telephone pole or near an optical fiber connection so that and optical fiber cable 502 input can be connected to the multiple existing coax cables.

Specifically, in many buildings it may be cost prohibitive and/or impractical to run optical fiber cable 502 to each unit. In addition, the various owners of units may want to purchase services that require different drop connections (i.e., the wiring (twisted pair, fiber, coax, etc.) that connects the unit to the feeder line using optical fiber cable 502. In addition, it may be more economical to use an existing drop connection (e.g., twisted pair) for some services (e.g., telephone). For example, one dwelling unit may purchase only telephone service (which may employ a twisted pair drop connection), another dwelling unit may purchase telephone and television service (which may employ a coaxial cable or coax cable and twisted pair drop connection), and yet another dwelling unit may purchase only internet access (which may employ a fiber conductor or coaxial cable drop connection). Embodiments of the present invention may be used to service buildings to supply service to units using any of various media including twisted pair, coaxial cable, fiber optics, CAT-5 (Ethernet), and/or others. The disclosure in my previous U.S. Pat. No. 9,485,468 is incorporated herein by reference.

While the device for cutting a microtrench device is preferably utilized to bury the temporary optical fiber network, any trenching device can be utilized. For example, the trench can be ⅛ inch to 1.5 inch wide and up to 6 inches deep when using the microtrenched, or 0.75 to 3 inches wide, and as deep as 24 inches for larger trenching devices.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A multifunctional reel carrier, spoil material handling container device configured for continuously forming a micro-trench, laying a cable or innerduct/microduct in the micro-trench, and filling the micro-trench comprising:
   a first trailer or first truck;
   a first container configured to contain spoil on the first trailer or first truck;
   at least one spoil transport device configured to continuously transport at least a portion of the spoil from a micro trencher configured to continuously create the micro-trench and deposit the spoil in the first container;
   at least one reel holder configured to hold a reel of the cable or innerduct/microduct on a second trailer or second truck and configured to continuously lay the cable or innerduct/microduct in the micro-trench; and
   a fill device configured to continuously fill the micro-trench with a fill after the cable or innerduct/microduct has been laid in the micro-trench, wherein the multifunctional reel carrier, spoil material handling container device is configured for continuously forming a micro-trench, continuously transporting spoil from the micro-trencher to the first container, continuously laying a cable or innerduct/microduct in the micro-trench from the at least one reel holder, and continuously filling the micro-trench with the fill from the fill device.

2. The multifunctional reel carrier, spoil material handling container device according to claim 1, wherein the least one spoil transport device is configured to transfer at least a portion of the spoil from the first container to the fill device so that the at least a portion of the spoil can be used as at least a portion of the fill.

3. The multifunctional reel carrier, spoil material handling container device according to claim 1, wherein the at least one spoil transport device comprises at least one vacuum device.

4. The multifunctional reel carrier, spoil material handling container device according to claim 3, wherein the at least one vacuum device comprises a first vacuum device constructed to vacuum the spoil from the micro trencher and a second vacuum device constructed to transfer at least a portion of the spoil from the first container to the fill device.

5. A multifunctional reel carrier, spoil material handling container device configured for continuously forming a micro-trench, laying a cable or innerduct/microduct in the micro-trench, and filling the micro-trench comprising:
   a first trailer or first truck;
   a first container configured to contain spoil on the first trailer or first truck;
   at least one spoil transport device configured to continuously transport at least a portion of the spoil from a micro trencher configured to continuously create the micro-trench and deposit the spoil in the first container;
   at least one reel holder configured to hold a reel of the cable or innerduct/microduct on the first trailer or first truck, or on a second trailer or second truck and configured to continuously lay the cable or innerduct/microduct in the micro-trench; and
   a fill device configured to continuously fill the micro-trench with a fill after the cable or innerduct/microduct has been laid in the micro-trench, wherein the multifunctional reel carrier, spoil material handling container device is configured for continuously forming a micro-trench, continuously transporting spoil from the micro-trencher to the first container, continuously laying a cable or innerduct/microduct in the micro-trench from the at least one reel holder, and continuously filling the micro-trench with the fill from the fill device, wherein the at least one spoil transport device comprises a conveyor.

6. A multifunctional reel carrier, spoil material handling container device configured for continuously forming a micro-trench, laying a cable or innerduct/microduct in the micro-trench, and filling the micro-trench comprising:
   a first trailer or first truck;
   a first container configured to contain spoil on the first trailer or first truck;
   at least one spoil transport device configured to continuously transport at least a portion of the spoil from a micro trencher configured to continuously create the micro-trench and deposit the spoil in the first container;
   at least one reel holder configured to hold a reel of the cable or innerduct/microduct on the first trailer or first truck, or on a second trailer or second truck and configured to continuously lay the cable or innerduct/microduct in the micro-trench; and
   a fill device configured to continuously fill the micro-trench with a fill after the cable or innerduct/microduct has been laid in the micro-trench, wherein the multifunctional reel carrier, spoil material handling container device is configured for continuously forming a micro-trench, continuously transporting spoil from the micro-trencher to the first container, continuously laying a cable or innerduct/microduct in the micro-trench from the at least one reel holder, and continuously filling the micro-trench with the fill from the fill device, wherein the at least one spoil transport device comprises a screw.

7. A method of continuously laying cable or innerduct/microduct comprising:
   providing a first trailer or first truck;
   providing a first container configured to contain spoil on the first trailer or first truck:
   providing at least one spoil transport device configured to continuously transport at least a portion of the spoil from a micro trencher configured to continuously create the micro-trench and deposit the spoil in the first container;

providing at least one reel holder configured to hold a reel of the cable or innerduct/microduct on a second trailer or second truck and configured to continuously lay the cable or innerduct/microduct in the micro-trench;

providing a fill device configured to continuously fill the micro-trench with a fill after the cable or innerduct/microduct has been laid in the micro-trench, wherein the multifunctional reel carrier, spoil material handling container device is configured for continuously forming a micro-trench, continuously transporting spoil from the micro-trencher to the first container, continuously laying a cable or innerduct/microduct in the micro-trench from the at least one reel holder, and continuously filling the micro-trench with the fill from the fill device;

continuously using the micro-trencher to cut a micro-trench in ground and create spoil;

continuously transporting at least a portion of the spoil from the micro-trencher to first first container constructed to contain spoil using at least one spoil transporting device;

continuously laying the cable and/or innerduct/microduct in the micro-trench from the at least one reel holder; and continuously filling the micro-trench with the fill from the fill device.

8. The method according to claim 7, further comprising using an outlet constructed to allow air to flow into and/or out of the first container.

9. The method according to claim 7, wherein the at least one spoil transporting device comprises at least one vacuum device.

10. The method according to claim 9, wherein the at least one vacuum device comprises a first vacuum device and using the first vacuum device to vacuum spoil from the micro trencher and deposit the spoil into the first container.

11. The method according to claim 7, wherein the at least one spoil transporting device comprises a second spoil transporting device comprising at least one second vacuum device, and using the at least one second vacuum device to transfer the spoil from the first container to the fill device.

12. The method according to claim 7, wherein the ground has a roadway surface and the micro-trench is cut through the roadway surface.

13. The method according to claim 7, further comprising applying a line marker to the ground to be cut by the micro trencher.

14. The method according to claim 13, wherein the line marker identifies a start and a stop position.

15. The method according to claim 13, wherein the filling of the micro-trench is conducted in one step.

16. A method of continuously laying cable or innerduct/microduct comprising:

continuously using a micro-trencher to cut a micro-trench in ground and create spoil;

continuously transporting at least a portion of the spoil from the micro-trencher to a first container constructed to contain spoil using at least one spoil transporting device;

continuously laying the cable and/or innerduct/microduct in the micro-trench from a reel device; and continuously filling the micro-trench with a fill from a fill device, wherein the at least one spoil transporting device comprises a second spoil transporting device comprising a conveyor.

17. A method of continuously laying cable or innerduct/microduct comprising:

continuously using a micro-trencher to cut a micro-trench in ground and create spoil;

continuously transporting at least a portion of the spoil from the micro-trencher to a first container constructed to contain spoil using at least one spoil transporting device;

continuously laying the cable and/or innerduct/microduct in the micro-trench from a reel device; and continuously filling the micro-trench with a fill from a fill device, wherein the at least one spoil transporting device comprises a second spoil transporting device comprising a screw.

18. The method according to claim 17, wherein the fill comprises a bonding agent.

19. A method of continuously laying cable or innerduct/microduct comprising:

continuously using a micro-trencher to cut a micro-trench in ground and create spoil;

continuously transporting at least a portion of the spoil from the micro-trencher to a first container constructed to contain spoil using at least one spoil transporting device;

continuously laying the cable and/or innerduct/microduct in the micro-trench from a reel device; and continuously filling the micro-trench with a fill from a fill device, wherein the ground has a roadway surface and the micro-trench is cut through the roadway surface, wherein the fill comprises a coloring agent so that a color of the fill substantially matches a color of the surface the micro-trench is formed in.

20. A method of providing a temporary and permanent optical fiber network comprising:

dispensing an optical fiber from a support, the optical fiber having a first end and a second end;

laying the dispensed optical fiber on a surface;

covering the dispensed optical fiber with a protection device that protects the optical fiber from footwear or vehicle traffic;

connecting the first end to a feed;

connecting the second end to a desired user; and using the method of claim 9 to bury the optical fiber to form a permanent optical fiber network.

21. The method according to claim 20, further comprising permanently mounting or burying the support.

22. The method according to claim 20, wherein the support comprises a reel.

23. The method according to claim 20, wherein the optical fiber having a first optical fiber connector mounted on the first end and a second optical fiber connector mounted on the second end.

24. A method of providing a temporary and permanent optical fiber network comprising:

dispensing an optical fiber from a first box containing a support, the optical fiber having a first end and a second end;

laying the dispensed optical fiber on a surface;

covering the dispensed optical fiber with a protection device that protects the optical fiber from footwear or vehicle traffic;

connecting the first end to a feed;

connecting the second end to a desired user;

forming a permanent optical fiber network by continuously using a micro-trencher to cut a micro-trench in ground and create spoil;

continuously transporting at least a portion of the spoil from the micro-trencher to a first container constructed to contain spoil using at least one spoil transporting device;

laying the cable and/or innerduct/microduct in the micro-trench from a reel device; and filling the micro-trench with a fill from a fill device, wherein the first box containing the support, having one or more first optical fiber extenders comprising a first reel or first loose coil of the optical fiber for input to the first box to allow optical fiber to be unwound for a temporary or final installation, one or more second optical fiber extenders comprising a second reel or second loose coil of the optical fiber for output from the first box to allow optical fiber to be unwound for a connection to a second box for a temporary or final installation, and one or more third optical fiber extenders comprising a third reel or third coil of the optical fiber for fiber drops from the first box to allow optical fiber to be unwound for connections to customers for temporary or final installation.

25. A method of continuously laying cable or innerduct/microduct comprising:

continuously using a micro-trencher to cut a micro-trench in ground and create spoil;

continuously transporting at least a portion of the spoil from the micro-trencher to a first container constructed to contain spoil using at least one spoil transporting device;

continuously laying the cable and/or innerduct/microduct in the micro-trench from a reel device;

continuously filling the micro-trench with a fill from a fill device;

applying a line marker to the ground to be cut by the micro trencher, wherein the filling of the micro-trench is conducted in one step, wherein the fill comprises a bonding agent and a coloring agent so that a color of the fill substantially matches a color of the surface the trench is formed in.

26. A multifunctional reel carrier, spoil material handling container device configured for continuously forming a micro-trench, laying a cable or innerduct/microduct in the micro-trench, and filling the micro-trench comprising:

a first trailer or first truck;

a first container configured to contain spoil on the first trailer or first truck;

at least one spoil transport device configured to continuously transport at least a portion of the spoil from a micro trencher configured to continuously create the micro-trench and deposit the spoil in the first container;

at least one reel holder configured to hold a reel of the cable or innerduct/microduct on the first trailer or first truck, or on a second trailer or second truck and configured to continuously lay the cable or innerduct/microduct in the micro-trench; and a fill device configured to continuously fill the micro-trench with a fill after the cable or innerduct/microduct has been laid in the micro-trench, wherein the multifunctional reel carrier, spoil material handling container device is configured for continuously forming a micro-trench, continuously transporting spoil from the micro-trencher to the first container, continuously laying a cable or innerduct/microduct in the micro-trench from the at least one reel holder, and continuously filling the micro-trench with the fill from the fill device, wherein the least one spoil transport device is configured to transfer at least a portion of the spoil from the first container to the fill device so that the at least a portion of the spoil can be used as at least a portion of the fill, and wherein the fill device is configured to mix the at least a portion of the spoil with cement and a bonding agent.

* * * * *